G. RISCHMULLER.
DEMOUNTABLE RIM.
APPLICATION FILED OCT. 11, 1919.
1,405,803.
Patented Feb. 7, 1922.
2 SHEETS—SHEET 1.
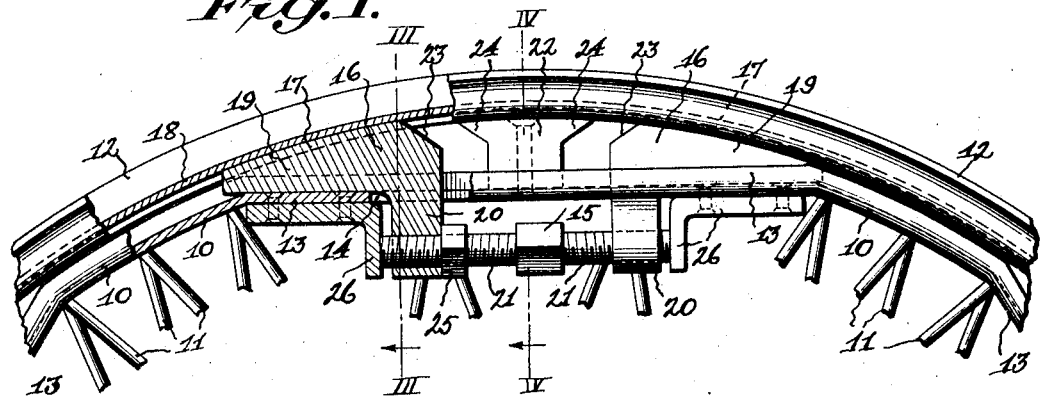
Fig. 1.
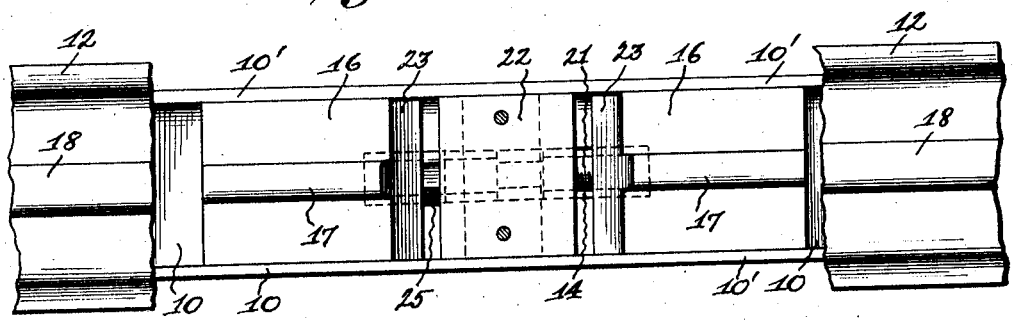
Fig. 2.
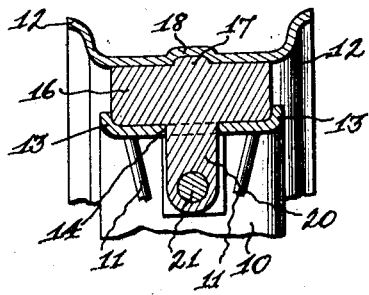
Fig. 3.
Fig. 4.
Witness
Chas. L. Griesbauer
Inventor
George Rischmuller,
W. Schoenborn.
Attorney
By

G. RISCHMULLER.
DEMOUNTABLE RIM.
APPLICATION FILED OCT. 11, 1919.

1,405,803.

Patented Feb. 7, 1922.
2 SHEETS—SHEET 2.

Witness
Chas. L. Griesbauer

Inventor
George Rischmuller,
By W. Schoenborn,
Attorney

UNITED STATES PATENT OFFICE.

GEORGE RISCHMULLER, OF SAN FRANCISCO, CALIFORNIA.

DEMOUNTABLE RIM.

1,405,803.   Specification of Letters Patent.   Patented Feb. 7, 1922.

Application filed October 11, 1919. Serial No. 329,949.

*To all whom it may concern:*

Be it known that I, GEORGE RISCHMULLER, a citizen of the United States of America, residing at San Francisco, in the county of San Francisco and State of California, have invented certain new and useful Improvements in Demountable Rims, of which the following is a specification.

This invention relates to new and useful improvements in demountable rims adapted for use in connection more especially with automobile wheels or other self-propelled vehicles.

An object of this invention is to provide locking means for maintaining the usual form of metallic rim in place upon the wheel which will prevent circumferential creeping or side movement of the rim.

Another object of this invention is to provide locking means for holding a rim on a wheel which is especially adapted for metallic wheels having wire spokes and which can be adapted to any of the standard wooden wheels with slight alterations without requiring one of special construction.

A further object of the invention is to provide simple and cheap means for positively locking the rim in place which can be easily and quickly attached to or detached from the wheel.

With the above other objects in view, this invention resides in the novel features of construction, formations, combinations, and arrangement of parts to be hereinafter more fully described and particularly pointed out in the appended claims.

In the drawings, in which similar reference characters indicate the same parts in the several figures, Figure 1 is a fragmentary side elevation partly in section of a metallic wheel showing my improved rim locking means applied thereto;

Figure 2 is a plan view of the locking means, showing parts of the wheel to which it is applied;

Figure 3 is a transverse sectional view on line III—III of Figure 1;

Figure 4 is a transverse sectional view on line IV—IV of Figure 1, illustrating a wrench especially adapted for operating my improved locking means;

Figure 5:
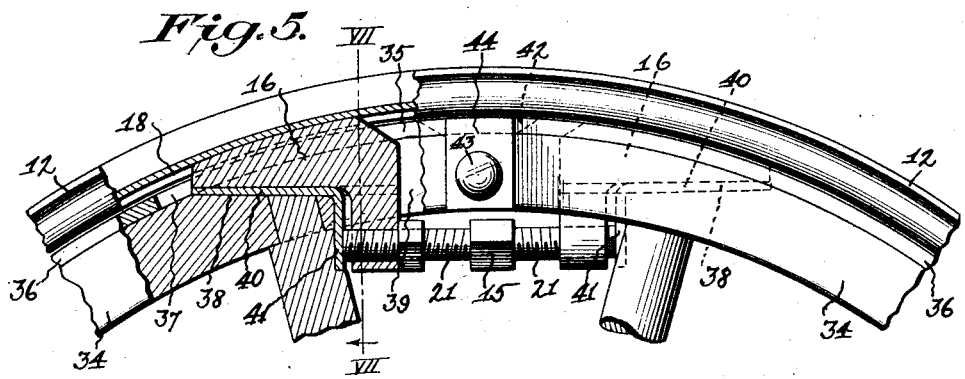
Figure 5 is an elevation, partly in section similar to Figure 1, of a wooden wheel showing my improved locking means applied thereto.

Referring to the drawings in the preferred form of wheel employing my locking device best shown in Figures 1 to 4, the numeral 10 designates in general the fixed rim of the wheel having wire spokes 11 and upon which is mounted a demountable rim 12. The fixed rim is flattened at intervals around its circumference, as indicated at 13, and provided with slots 14 for receiving the locking devices 15 which are suitably mounted on the flattened portions of the fixed rim 10 and guided in their movements by flanges 10' on the edges of the felly.

The locking device 15 comprises locking members 16 slidingly mounted on the flattened portions 13 of the fixed rim 10 and are provided with projections 17 adapted to engage with a bead 18 extending circumferentially around the middle part of the rim 12. The locking members 16 have wedge extensions 19 adapted to be forced apart to engage the flattened portions 13 of the fixed rim of the wheel and the rim 12 for locking it in place against turning on the wheel and the projections 17 prevent lateral movement of the rim.

The two locking members 16 are provided with lugs 20 adapted to extend through the slot 14 toward the wheel axle and are similar to each other, excepting the lugs 20 are provided with oppositely threaded apertures for receiving an operating bolt 21 having oppositely threaded ends, whereby the locking members may be moved into and out of locking position by turning the bolt 21 in the required directions. The fixed rim 10 is provided with projections 22 fastened to the middle of the flattened portions 13 of the felly after the locking members have been placed in position, which serve as abutments, limiting the movement of locking members in the direction for retracting them from their locking position.

It will be noted that the locking members 16 are beveled at 23 and that the projections 22 have extensions 24 shaped to fit the beveled portions of the locking members; these extensions serve to hold the locking members within the periphery of the wheel when they are retracted by the operating bolt 21. Attached to the fixed rim member on the undersides of the flattened portions 13 adjacent the ends of slots 14 are angle pieces 26 which are so spaced that the ends of operating bolt 21 loosely engage with them. These angle pieces act as abutments and cause the locking members 16 each to move equally when the bolt 21 is turned. A lock nut 25 may be provided, if desired, to prevent the bolt 21 from coming loose.

In Figure 4, I have illustrated a wrench 27 which is especially suitable for operating the locking bolt 21. This wrench comprises a handle 27' with an integral jaw 28, and a jaw member 29 which is pivoted to the first member at 30. A spring 31 attached to the jaw member 20 and engaging the handle normally forces the jaw portion 32 toward the jaw 28 on the handle. On the other side of the pivot 29, the jaw member 20 is provided with an extension 33 adapted to be engaged by the thumb of the operator for opening and closing the jaws.

Figure 6:
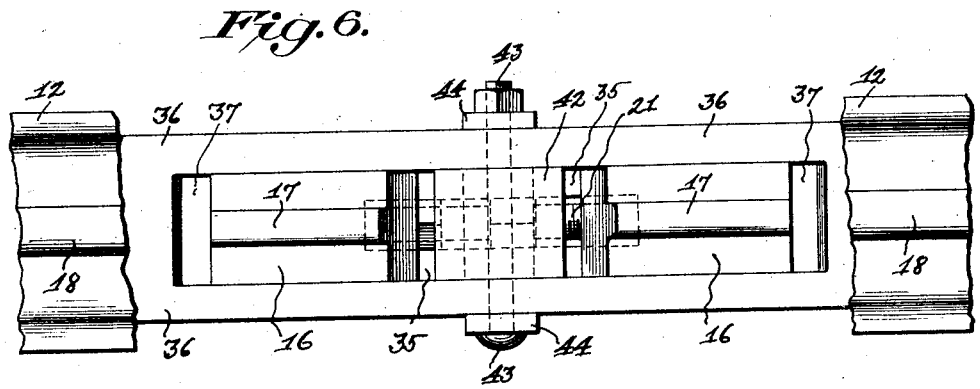
Figure 6 is a plan view of the same wheel and the rim locking means shown in Figure 5.
Figure 7:
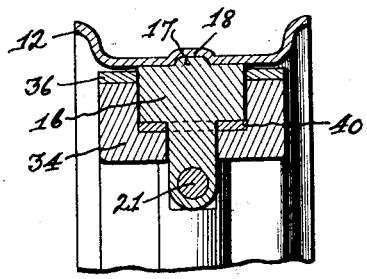
Figure 7 is a transverse sectional view on line VII—VII of Figure 5.
Figure 8:
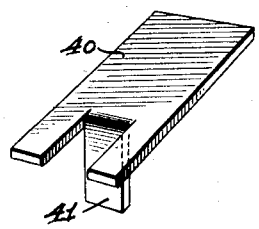
Figure 8 is a perspective view of a liner adapted to be used with a wooden wheel in connection with the locking means.

Referring to Figures 5 to 8, I have shown how my locking device can be used with wooden wheels. In this form the wooden felly 34 is recessed as at 35 and its metallic casing or fixed rim 36 is slotted at 37 for the reception of the locking device 15. The same form of locking members 16 and operating bolt 21 are provided and the wheel is adapted to receive the same form of rim 12 with a circumferential bead 18. The recess 35 in the felly is so shaped that a flattened portion 38 and slot 39 are provided for the locking device. In this recess is first placed a set of lining members 40, (see Fig. 8) which are adapted to lie on the flat part of the recess with the exception of a small depending portion 41 formed by cutting into one end of the member 40, and bending the middle portion down. These lining members 40 are for the purpose of providing a bearing surface for the members 16 and bolt 21 which are next placed in the recess. An abutment member 42 similar to the projections 22, shown in Figures 1 and 2, is last to be placed within the recess and is retained in position by means of a bolt 43 which also holds plates 44 on the opposite sides of the felly which tend to brace the sides of the felly next to the recess against lateral strains due to the rim resting on the locking members.

The operation of the invention illustrated in Figs. 1 to 4 is as follows: If it is desired to remove the rim 12 with its tire from the fixed rim 10 and wheel, all that is necessary is to properly turn all the operating bolts 21 with any suitable wrench, such as 27, in such a direction so that the wedge extensions 19 with the projections 17 of all the locking members 16 are within the periphery of the wheel or fixed rim 10. When said locking members 16 are in such retracted positions, the rim 12 with its tire can be slid sidewise from the fixed rim 10 of the wheel, and another demountable rim with its tire can be easily and quickly slipped on said fixed rim, and all the locking members 16, by the reverse operation just described, may be made to have their ridges or projections 17 pass into the circumferential bead 18 of the rim 12, as shown in Figure 1, and securely clamp the demountable rim against creeping around the periphery of the fixed rim 10 or wheel and at the same time firmly lock said rim with its tire from movement in a direction transverse to the plane of the wheel.

In the form shown in Figs. 5 to 8, the operation of the locking means is the same as just described with reference to Figures 1 to 4.

From the foregoing disclosures, taken in connection with the accompanying drawings, it will be manifest that a rim locking means such as described is provided, which will fulfill all the necessary requirements of such a device, it being understood that various minor changes in the specific details of construction can be resorted to within the scope of the appended claims without departing from or sacrificing any of the advantages of the invention.

What I claim is:—

1. In a device of the character described including a wheel having a fixed rim, a demountable rim having a circumferential bead forming an inner circular depression therefor, locking wedges having longitudinal ridges and mounted substantially tangentially to the circumference of the fixed rim and movable in a direction in the plane of the wheel and so constructed, arranged and adapted to engage said demountable rim to hold the same from creeping around the fixed rim in the plane of the wheel and also against lateral movement in a direction transverse to the plane of the wheel by the seating of said ridges in the circular depression of the demountable rim.

2. A device of the character described including a wheel body with recesses therein, a demountable rim therefor having an outwardly projecting bead extending circumferentially around the middle section of the rim, pairs of locking wedges having projections adapted to engage said rim and bead and mounted in said recesses in the wheel body, a projection on the wheel body in each of said recesses forming an abutment for said wedges in their retracted positions, extensions from said wedges passing into the wheel body and between the spokes, and a bolt having oppositely threaded ends engaging said extensions for operating the locking wedges.

In testimony whereof I affix my signature.

GEORGE RISCHMULLER.